Patented Mar. 5, 1946

2,395,876

UNITED STATES PATENT OFFICE 2,395,876

CHEMICAL PROCESS

Kenneth K. Kearby, Elizabeth, N. J., assignor to Standard Oil Development Company, a corporation of Delaware No Drawing. Application August 14, 1942, Serial No. 454,813

5 Claims. (Cl. 260—680)

This invention relates to the catalytic dehydrogenation of hydrocarbons in the presence of steam and more particularly to the use of large amounts of steam in the dehydrogenation of low molecular weight unsaturated hydrocarbons to less saturated hydrocarbons. This invention provides an improved process, for example, for the dehydrogenation of olefins of at least 4 carbon atoms per molecule, and of aralkyl hydrocarbons containing at least 2 carbon atoms in an alkyl group. Thus, it may be used to obtain improved yields of butadiene 1–3 from the normal butenes, of pentadienes from the pentenes, of styrene from ethyl benzene, of methyl styrene from isopropyl benzene, etc.

A number of active dehydrogenation catalysts have been developed which are not poisoned by water vapor. Catalysts of this type have been described in the co-pending applications Ser. No. 411,559, filed September 19, 1941, and Ser. No. 430,873, filed February 14, 1942, by the present inventor, the present case being a continuation-in-part of both the earlier cases just mentioned. These catalysts contain a large amount, usually a major proportion of magnesium oxide as a base material, lesser amounts (usually between about 3% and 49% of the total weight of the catalyst) of an active dehydrogenating compound such as an oxide of iron, of chromium, of cobalt, or of nickel. They also contain small amounts of a basic oxide as a promoter (usually between 0.5% and 10%) such as an oxide of potassium, sodium, lithium, barium or calcium. Of these promoters, potassium oxide is by far the most effective. A stabilizer may also be added in small amounts (usually between about 0.5% and 10%) to prevent the promoter from volatilizing or the catalyst from becoming inactive. Examples of stabilizers are the oxides of metals of the right hand side (transition series) of Groups I, II and III of the periodic system, and other non-acidic oxides including those of thorium, zirconium, cerium and other rare earths, lead and bismuth, also the non-acidic transition oxides of chromium, manganese, cobalt and nickel. Particularly effective stabilizers are the oxides of copper (preferably CuO), of aluminum ($Al_2O_3$), of thorium (preferably $ThO_2$), of zinc (preferably ZnO), and silver or silver oxide. Similar catalysts may also be prepared by substituting for all or a part of the magnesium oxide catalyst base material, an oxide of zinc, zirconium or beryllium. Manganese oxides may also be used as active dehydrogenating constituents. Zinc oxide or chromium oxide may also be used as a stabilizer, particularly in $MgO$—$Fe_2O_3$—$K_2O$ catalysts. Dehydrogenation catalysts may also be prepared with mixtures of two or more compounds from any of the above described groups of catalyst components, namely the catalyst base materials, active dehydrogenating compounds, stabilizers and promoters.

These catalysts have the advantage that they may be used for dehydrogenating hydrocarbons in the presence of steam, thus permitting the use of steam to lessen carbon deposition on the catalyst, and to reactivate the catalyst when necessary.

It has now been found that dehydrogenation is greatly improved when using very large proportions of steam, much larger than have been indicated as desirable for maintaining catalyst activity. The use of large proportions of steam, preferably greater than about 12 volumes per volume of butene, for example, has been found to increase the conversion per pass without decreasing the selectivity, thus greatly increasing the production of butadiene. The butadiene is also produced in a much more concentrated form, which reduces the requirements for recovery and purification, important factors in lessening the cost of the product. This is illustrated in the following examples:

EXAMPLE I

Butene was dehydrogenated to butadiene by passing through a KA2S alloy steel tube heated to 1200° F. and containing 200 cc. of catalyst in a series of runs in which the butene feed rate was maintained constant at 250 volumes per volume of catalyst per hour and the steam/butene ratio was varied. The conversion of butene to other products, the selectivity (the percent of the total amount of initial material converted which is converted to butadiene) and the yield of butadiene are given in the following table:

*Table No. 1*

[Butene dehydrogenation: 1200° F.; 250 v./v./hr. butene feed]

|  | Steam/butene ratio | | |
|---|---|---|---|
|  | 7/1 | 14/1 | 28/1 |
| Percent conversion | 24.5 | 41 | 46.5 |
| Percent selectivity | 79 | 81 | 78 |
| Percent yield of butadiene | 19.5 | 33.2 | 36.3 |

Thus, the yield of butadiene was nearly doubled by increasing the steam/butene ratio from 7 to 28, even though the time of contact with the catalyst was greatly decreased by the large volume of steam.

The process of this invention is also applicable to the dehydrogenation of hydrocarbons in mixed hydrocarbon gases, such as the cracked petroleum gases and distillate fraction thereof, as illustrated in the following example:

EXAMPLE II

A gas containing 1.25% $C_3$ hydrocarbons, 18.4% butane, 20.0% isobutene, 59.7% n-butenes and 0.65% $C_{5+}$ hydrocarbons was passed with steam at 1200° F. over a catalyst similar to that used in Example I. The gas analysis of the products of several runs at varying feed rates and proportions of steam, and the reactions indicated thereby, are given in the following table:

Table No. 2
[Butene dehydrogenation: 1200° F.]

|  |  | Steam/hydrocarbon ratio | | | | |
| --- | --- | --- | --- | --- | --- | --- |
|  |  | 7 | 14 | 28 | 14 | 28 |
| Hydrocarbon, v./v./hr | | 500 | 250 | 125 | 500 | 250 |
| Steam, v./v./hr | | 3,500 | 3,500 | 3,500 | 7,000 | 7,000 |
| Gas analysis: | | | | | | |
| $H_2$ | (Feed) | 23.0 | 29.4 | 46.0 | 26.4 | 36.2 |
| $C_1$-$C_3$ | 1.25 | 6.4 | 7.4 | 11.9 | 7.1 | 10.1 |
| $C_4H_{10}$ | 18.4 | 13.4 | 11.8 | 9.3 | 13.2 | 11.1 |
| $i$-$C_4H_8$ | 20.0 | 14.3 | 13.0 | 10.1 | 14.2 | 11.4 |
| $n$-$C_4H_8$ | 59.7 | 31.3 | 24.3 | 10.1 | 25.4 | 16.6 |
| Percent reacted: | | | | | | |
| $C_4H_8$ | | 11.2 | 13.2 | 11.7 | 13.6 | 14.3 |
| $C_4H_{10}$ | | 2.0 | 4.7 | 1.0 | —1.0 | 0.5 |
| $i$-$C_4H_8$ | | 3.7 | 3.8 | 1.0 | 0.3 | 6.0 |
| $n$-$C_4H_8$ | | 29 | 40 | 67 | 40 | 55 |
| Yield $C_4H_6$ based on | | | | | | |
| $C_4H_8$ | | 25 | 33 | 39 | 32 | 41 |
| $C_4H_8$ selectivity to $C_4H_6$ | | 86 | 83 | 58 | 80 | 74 |

Thus under these conditions the butane and isobutene are substantially unaffected and may be considered to serve mainly as diluents in the feed.

The condition for carrying out the process of this invention will be found to vary widely, depending upon the extent of the dehydrogenation desired and the activity of the particular catalyst. The ratio of volumes of steam to the hydrocarbons to be dehydrogenated should be between about 12 and 50, and is preferably about 20 to 30. The dehydrogenation temperature ranges from about 1000° F. to 1300° F., temperatures between 1100° F. and 1250° F., being generally preferred with the catalyst described above. The hydrocarbon feed rate may range from below 150 up to 1000 or more volumes per volume of catalyst per hour (expressed at standard temperature and pressure conditions) and the process is preferably conducted at about atmospheric or slightly higher pressure; although pressures substantially above or below atmospheric may be used, they do not usually offer sufficient advantages to offset the increased equipment cost.

The foregoing description of this invention is presented for purposes of illustration, and the invention is not limited to the specific examples presented herein.

I claim:

1. A process for dehydrogenating olefins to diolefins comprising passing a mixture of an olefin and steam at a suitable temperature for said reaction over a dehydrogenation catalyst which is active in the presence of steam and which comprises more than 50% magnesium oxide, lesser amounts of an active dehydrogenating metal oxide and small amounts of potassium oxide as a promoter, said mixture containing about 12 to 50 volumes of steam per volume of said olefin.

2. Process according to claim 1 in which said mixture contains about 20 to 30 volumes of steam per volume of said olefin.

3. A process for dehydrogenating an olefin having 4 to 6 carbon atoms per molecule to diolefins comprising passing a mixture of said olefin and steam containing about 12 to 50 volumes of steam per volume of olefin, at a suitable reaction temperature, over a dehydrogenation catalyst which is active in the presence of steam and which comprises more than 50% magnesium oxide, lesser amounts of an active dehydrogenating metal oxide and small amounts of potassium oxide as a promoter.

4. A process for dehydrogenating a straight-chain butene to butadiene comprising passing a mixture of said butene and steam, in a proportion between about 12 and 50 volumes of steam per volume of butene, at a suitable reaction temperature over a dehydrogenation catalyst which is active in the presence of steam and which comprises more than 50% magnesium oxide, lesser amounts of an active dehydrogenating metal oxide and small amounts of potassium oxide as a promoter.

5. A process for dehydrogenating a pentene to a pentadiene comprising passing a mixture of a pentene and steam in a proportion between about 12 and 50 volumes of steam per volume of pentene, at a suitable reaction temperature over a dehydrogenation catalyst which is active in the presence of steam and which comprises more than 50% magnesium oxide, lesser amounts of an active dehydrogenating metal oxide and small amounts of potassium oxide as a promoter.

KENNETH K. KEARBY.